United States Patent [19]

Frean

[11] Patent Number: 5,549,339
[45] Date of Patent: Aug. 27, 1996

[54] LIFTING DEVICE FOR CYLINDRICAL OBJECTS

[76] Inventor: Robert G. Frean, 108 Kalamunda Rd., Gooseberry Hill 6076, Australia

[21] Appl. No.: 193,186

[22] PCT Filed: Jun. 12, 1992

[86] PCT No.: PCT/AU92/00278

§ 371 Date: Jun. 23, 1994

§ 102(e) Date: Jun. 23, 1994

[87] PCT Pub. No.: WO92/22492

PCT Pub. Date: Dec. 23, 1992

[30] Foreign Application Priority Data

Jun. 12, 1992 [AU] Australia ............... PK6624

[51] Int. Cl.$^6$ ............... B65D 63/18; B65G 7/12
[52] U.S. Cl. ............... 294/31.2; 294/164; 294/165; 294/170
[58] Field of Search ............... 294/31.2, 33, 67.4, 294/67.41, 74, 81.55, 119.2, 142, 147–151, 153–155, 157, 164–170

[56] References Cited

U.S. PATENT DOCUMENTS

| 2,486,827 | 11/1949 | Duncan | 294/154 |
|---|---|---|---|
| 2,654,629 | 10/1953 | Renfroe . | |
| 3,086,806 | 4/1963 | McAndrew | 294/33 |
| 3,116,947 | 1/1964 | Brownrigg | 294/31.2 |
| 3,194,462 | 7/1965 | Tupper | 294/31.2 X |
| 3,257,054 | 6/1966 | Miesel | 294/149 |
| 3,278,097 | 10/1966 | Duckworth | 294/148 |
| 3,799,600 | 3/1974 | Chappell | 294/31.2 |
| 3,941,412 | 3/1976 | Carpenter | 294/151 X |
| 3,963,270 | 6/1976 | Mori et al. . | |
| 4,754,996 | 7/1988 | Tecca et al. | 294/31.2 X |
| 4,804,218 | 2/1989 | Hilliard | 294/31.2 |

FOREIGN PATENT DOCUMENTS

| 357946 | 9/1922 | Germany | 294/31.2 |
|---|---|---|---|
| 3245674 | 6/1983 | Germany . | |
| 642324 | 4/1984 | Switzerland . | |
| 1426-917 | 9/1988 | U.S.S.R. . | |
| WO91/01929 | 2/1991 | WIPO . | |

Primary Examiner—Johnny D. Cherry
Attorney, Agent, or Firm—Larson and Taylor

[57] ABSTRACT

A lifting device (100) having two restraining devices (102) coupled to a handle (106) by a cord (104). The restraining devices (102) receive a cylindrical object such as a gas cylinder (110) and lifting of the handle (106) tensions the cord (104) and causes the restraining devices (102) to clamp onto the gas cylinder (110). Accordingly, the gas cylinder (110) can be conveniently lifted and carried, and, when the gas cylinder (110) is lowered onto its side, is inhibited from rolling. In another embodiment, the restraining devices (102) are independently secured about the gas cylinder (110) by securing devices (27). Also, a cleat may be used to maintain the clamping force of the restraining devices (102) onto the gas cylinder (110).

17 Claims, 2 Drawing Sheets

5,549,339

LIFTING DEVICE FOR CYLINDRICAL OBJECTS

FIELD OF THE INVENTION

The present invention relates to a lifting device particularly, although not exclusively, envisaged for use in lifting a cylindrical object such as, for example, a gas bottle, an oxy-acetylene bottle, a scuba tank, a large diameter pipe or the like.

BACKGROUND OF THE INVENTION

The carrying of cylinders, especially gas containing cylinders, is of particular difficulty. This is because the cylinders are generally relatively heavy, relatively dense and hence difficult to manipulate and carry—even for relatively small cylinders such as scuba tanks. A further problem is that, when laid on their side, cylinders tend to roll if not on a level surface of if transported.

I have solved the latter problem with a restraining device described and claimed in International Patent Application No. PCT/AU90/00326 (W091/01929). The restraining device is designed to adapt to a large range of diameters of cylinders and has a base for securement to a surface or beam, or for providing stability against the cylinder rolling. The restraining device 11 is shown in FIG. 1, is formed from elastomeric material and comprises a base 17, a pair of side portions 19 depending from the base 17 to define a gap 21 for receiving a gas cylinder and to define a clamping ring 23 for frictionally engaging the curved surface of the gas cylinder. The restraining device 11 also, has out-turned portions 25 disposed one to each side of the gap 21 and a securing device 27 for releasably securing the out-turned portions 25 together so as to secure the cylinder into the restraining device 11. The out-turned portions 25 each have an anchoring element 31 hingedly mounted into a hole 32 in a reinforced portion 33. The base 17 of the restraining device 11 is elongate and has an inner longitudinal face 43 and an outer longitudinal face 45, each disposed substantially parallel to the clamping ring 23. The clamping ring 23 is fixed to the inner longitudinal face 43 intermediate its length by a bridging portion 47 and two reinforcing webs 49. The side portions 19 each have a support arm 51 extending from the base 17 to proximate the end of the out-turned portions 25. The reinforcing webs 49 extend from the base 17 to the support arms 51 and are contiguous the clamping ring 23. An aperture 53 exists between each of the reinforcing webs 49 and the base 17 and side portions 19 for use in attaching the restraining device 11 to a surface, such as, for example, a wall.

I have discovered that an adaption based on two of the restraining devices can be used as an effective means to carry a cylinder—by one person for carrying small cylinders and with four or more of the restraining devices used by two people for carrying large cylinders.

SUMMARY OF THE INVENTION

Therefore, it is an object of the present invention to provide a lifting device for a cylindrical object wherein the lifting device inhibits rolling of the object when laid on its side and allows hand carrying of the object without requiring the person to grasp the object.

In accordance with another aspect of the present invention there is provided a lifting device for carrying a cylindrical object, the lifting device comprising:

a handle for grasping by a person's hand;

an elongate connecting means to which the handle is fixed; and, a securing means removably attachable to the object at two spaced apart locations, the securing means being coupled to the handle by the elongate connecting means, whereby, in use, the handle can be used to carry the object and the securing means inhibits rolling of the object when laid on its side.

In one embodiment of the invention the securing means are securely attached to the object.

In another embodiment tension developed in the elongate connecting means causes the securing means to grip the object; the gripping force increasing with the tension in the elongate connecting means and hence increasing with the force of the weight (mass x acceleration due to gravity) of the object.

In accordance with one aspect of the present invention there is provided a lifting device for carrying a cylindrical object, the lifting device comprising:

two restraining devices located about the object and spaced apart along the length of the object, the restraining devices each having a base for inhibiting rolling of the object;

a handle disposed between the restraining devices; and, an elongate connecting means coupling the handle to the restraining devices;

whereby, in use, a person can carry the object by using the handle, and the restraining devices inhibit rolling of the object when laid on its side.

Typically, the restraining devices are the same as or similar to the restraining devices of my International Patent Application No. PCT/AU90/00326 (W091/01929).

Typically, the elongate connecting means is a cord, cable or strap or the like. Preferably, the elongate connecting means is flexible.

Preferably, the two restraining devices and the handle can be coupled together into a single unit for ease of storage.

Preferably, the restraining devices each have a gripping means for gripping the object for inhibiting sliding of the restraining devices along the object towards each other. Typically, the gripping means is in the form of an edge of a support arm disposed along an outer edge of each of the restraining devices and disposed parallel to a radius of the object.

BRIEF DESCRIPTION OF THE DRAWINGS

One embodiment, being an example only, of the present invention will now be described with reference to the accompanying drawings, in which.

DETAILED DESCRIPTION OF PREFERRED EMBODIMENTS

Figure 2:
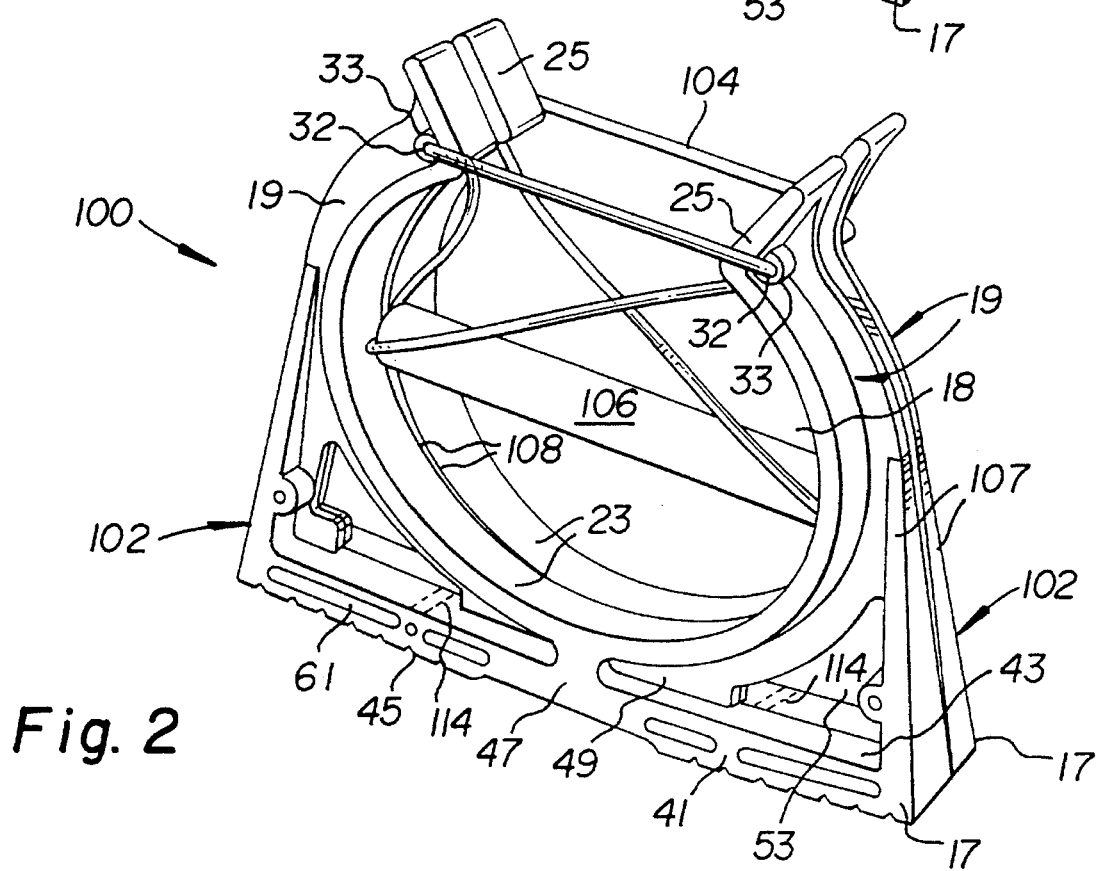
FIG. 2 is a perspective view of a lifting device, shown in a "storage mode"
Figure 3:
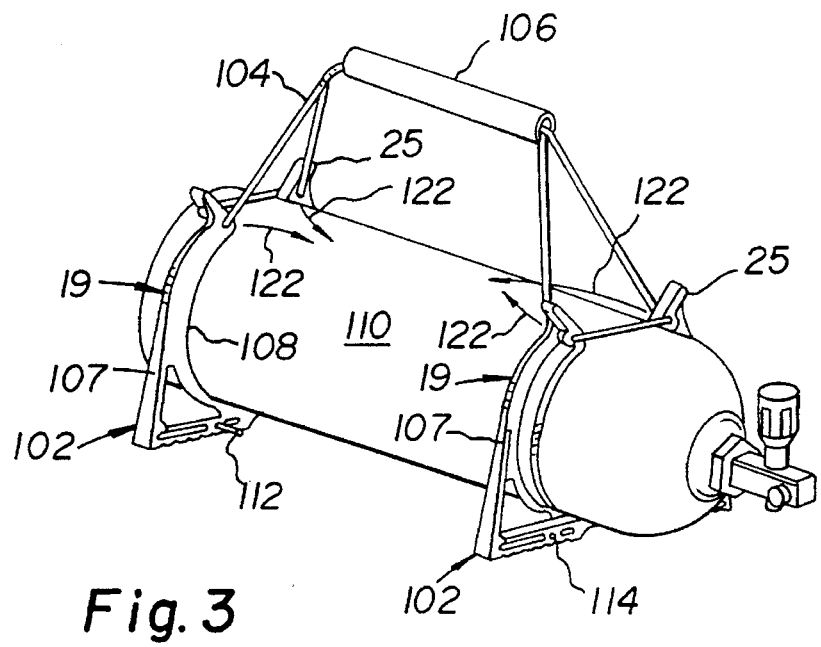
FIG. 3 is a perspective view, seen from above, of the lifting device of FIG. 2, shown attached to a cylindrical object being a gas bottle in a "carrying mode"; and, FIG. 4 is a side view of the lifting device and gas bottle of FIG. 3.
Figure 4:
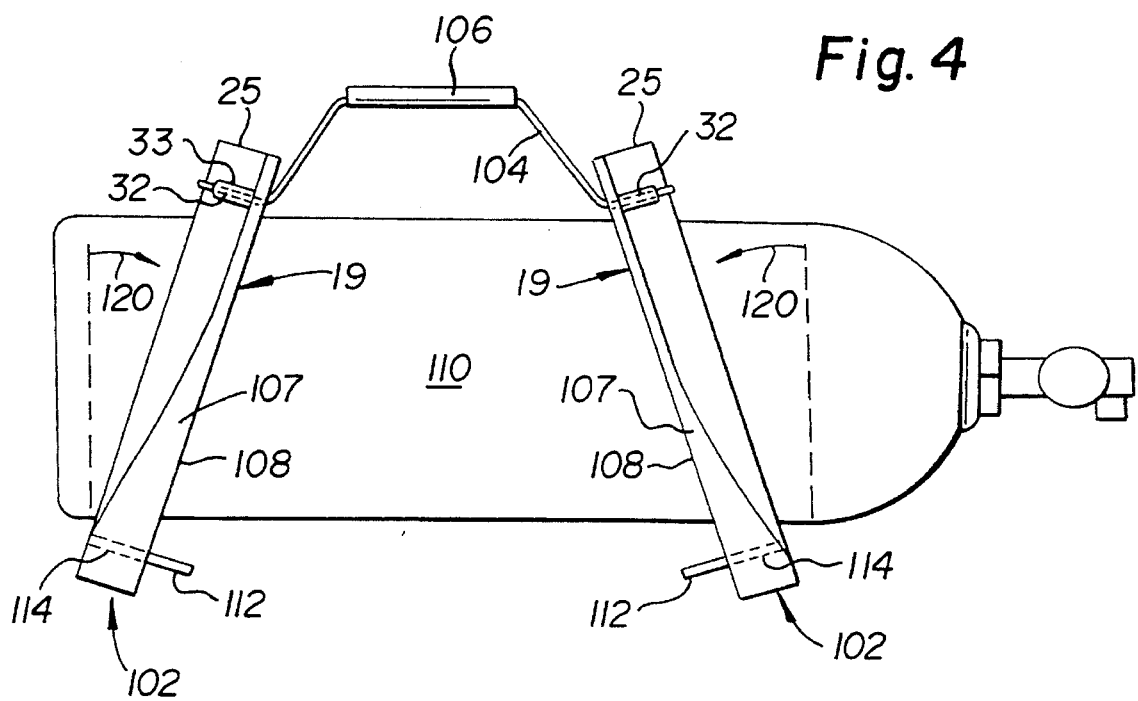

In FIGS. 2 to 4 there is shown a carrying device 100 comprising two restraining devices 102, an elongate connecting means in the form of a cord 104, and a handle 106.

The restraining devices 102 are similar to the restraining device 11 of my International Patent Application No. PCT/AU90/00326 (WO 91\01929) and like numerals denote like parts. The restraining devices 102 differ from the restraining device 11 partly in that the restraining devices 102 are effectively two identical halves of one restraining device 11, the halves being taken by a vertical cut through the base 17 and the side portions 19. Hence, each of the restraining devices 102 has a support arm 107 located at a transverse edge of the clamping ring 23. As best shown in FIG. 4, each of the restraining devices 102 has an edge, referred to as a locking edge 108, located at the juncture between the support arm 107 and the clamping ring 23. The locking edge 108 serves to lock the restraining device 102 to a gas cylinder 110 as explained hereinafter.

Each of the restraining devices 102 also has a locking pin 112 and a hole 114. The pin 112 and hole 114 are located in the base 17 and are typically on the same side of the restraining device 102 as the locking edge 108. The pin 112 of one of the restraining devices 102 is securely received in the hole 114 of the other restraining device 102. When both of the pins 112 are located in both of the corresponding holes 114, the locking edges 108 of both of the restraining devices 102 are coupled together as shown in FIG. 2 in what is hereinafter referred to as a "storage mode". To achieve locking, the pin 112 experiences an interference fit with respect to the hole 114.

The restraining devices 102 also differ from the restraining device 11 in that they are devoid of the securing device 27. In its place are the cord 104 and the handle 106. The cord 104 is threaded through the holes 32 of the out-turned portions 25 of each of the restraining devices 102. Conveniently, two ends of the cord 104 are tied together within the handle 106. The handle 106 is typically in the form of a tube made of plastics material. Preferably, the length of the handle 106 is approximately equal to the diameter of the confines of the restraining devices 102 so that the handle 106 and the cord 104 can be stored within the confines of the restraining devices 102.

It is envisaged that a cleat (not shown) may be provided on the cord 104 proximate the out-turned portions 25 for maintaining the clamping force of the restraining devices 102 about the gas cylinder 110 when the handle 106 has been released and the restraining devices 102 are set upon a support surface. The cleat has the effect of inhibiting gradual "walking" of the restraining devices 102 towards each other through repeated lifting and putting down of the gas cylinder 110.

In use, the lifting device 100 is placed in a storage mode by inserting the locking pin 112 of one of the restraining devices 102 into the corresponding hole 114 of the other restraining device 102 and vice versa for the other locking pin 112 and corresponding hole 114. The handle 106 is then disposed within the confines of the restraining devices 102 such that its ends bear against the clamping ring 23 and slightly resiliently deform the side portions 19. Resilience and deformation has the effect of clamping the handle 106 within the restraining devices 102. Typically, the cord 104 is of such a length that when the handle 102 is secured within the restraining devices 102, there is little or no free cord 104 left to dangle (see FIG. 2). Note that a portion of the cord 104, as shown in FIG. 2, is hidden behind the side portions 19 at the right hand side of the page.

The carrying device 110 can be manipulated from the storage mode shown in FIG. 2 to an "carrying mode" shown in FIG. 3 by pulling the two restraining devices 102 apart so as to remove the pins 112 from their corresponding holes 114 and removing the handle 106 from the confines of the restraining devices 102. If desired, the handle 106 may be removed first. The end of the gas cylinder 110 is then slid lengthwise into one of the restraining devices 102 so that the clamping ring 23 is contiguous the curved surface of the gas cylinder 110. Similarly, the other restraining device 102 is located upon the other end of the gas cylinder 110. Alternatively, the gas cylinder 110 can be inserted via the gap 21—especially for long gas cylinders requiring two of the lifting devices 100.

Lifting the handle 106 causes the cord 104 to be drawn through the holes 32 in the out-turned portions 25 so that a part of the cord 104 becomes taut across a part of the curved surface of the gas cylinder 110 between the out-turned portions 25 and pulls the two out-turned portions 25 of each of the restraining devices 102 towards each other. This has the effect of tensioning the restraining devices 102 about the gas cylinder 110. Applying further lifting force to the handle 106 places the cord 104 in further tension and increases the clamping force of the restraining devices 102 about the curved surface of the gas cylinder 110. Also, the increase in tension in the cord 104 tends to angle the out-turned portions 25 of the restraining devices 102 towards each other with respect to the bases 17 as shown in FIG. 4 by arrows 120. Furthermore, the tension in the cord 104 tends to cause the side portions 19 to twist about their length so that the locking edges 108 of the side portions 19 tend to bite into the curved surface of the gas cylinder 110 as indicated in FIG. 3 by arrows 122. Such biting increases the grip of the restraining devices 102 on the gas cylinder 110. Hence, it can be seen that the action of the force of the weight of the gas cylinder 110 acts upon the cord 104 and increases the gripping effect of the restraining devices 102. Or put another way, the grip provided by the restraining devices 102 increases with increases in the force of the weight of the gas cylinder 110 to be lifted. Hence, there is an efficient application of gripping force for lifting a gas cylinder 110 of a given mass.

To achieve the best-gripping effect, it is preferred that the restraining devices 102 be disposed with their respective locking edges 108 facing each other.

Where a cleat is used on the cord 104 between the out-turned portions 25 and the ends of the handle 106, the gripping force of the restraining devices 102 on the gas cylinder 110 is substantially maintained even where the gas cylinder 110 is put down and the tension removed from the remainder of the cord 104, i.e. in the vicinity of the handle 106.

Figure 1:
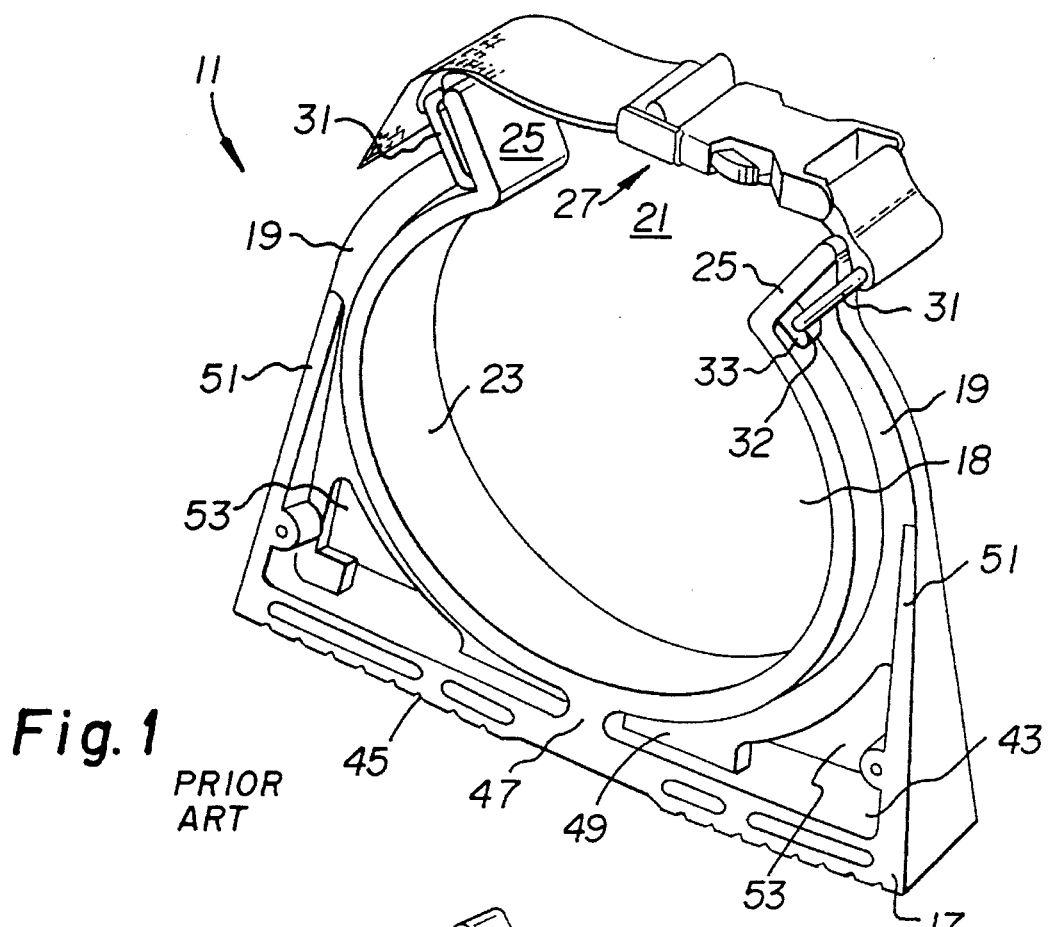
FIG. 1 is a perspective view, seen from above, of a restraining device according to my International Patent Application No. PCT/AU90/00326 (WO 91 01929)

In accordance with another embodiment of the present invention, two of the restraining devices 11 shown in FIG. 1 may be placed about the gas cylinder 110 in similar manner to that shown in FIG. 3 and the restraining devices 11 tensioned by use of the securing device 27. A cord or strap can then be located about the securing device 27 of one of the restraining devices 11 through the handle 106 and to the other restraining device 11 about its securing device 27. In such an arrangement, angling of the restraining device 11 and twisting of the side portions 19 does not occur. It is the tension in the securing device 27 which maintains the grip of the restraining device 11 about the curved surface of the gas cylinder 110.

In use, another embodiment is assembled by attaching the ends of the cord 104 to the securing devices 27 of two restraining devices 11. The restraining devices 11 are then placed about the ends of the gas cylinder 110 and the securing devices 27 are tensioned so that the restraining devices 11 securely grip the cylinder 110. The handle 106 may then be lifted to raise the gas cylinder 110 off the ground for carrying.

The first embodiment of the lifting device 100 has the advantage that a cylinder such as a gas cylinder 110 can be lifted and carried by hand with relative ease and is inhibited from rolling by the restraining devices 102 when the gas cylinder 110 is placed on its side. Also, by the angling of the restraining devices 102 and the twisting of the side portions 19, gripping of the gas cylinder 110 is effected. Due to the elastomeric nature of the restraining devices 102 and the tensioning effect of the cord 104, a gas cylinder 110 which has a diameter smaller than the diameter of the internal dimension of the restraining devices 102 can be clamped into position and carried. The pins 112 and corresponding holes 114 enable the two restraining devices 102 to be conveniently joined together for storage. Also, the length of the handle 106 allows for its convenient storage within the confines of the restraining devices 102 when in the storage mode. This is particularly useful given the problems which may otherwise occur in fouling with other tools and the like in the event that the elements of the lifting device 100 are not securable together.

Modifications and variations such as would be apparent to a skilled addressee are deemed within the scope of the present invention. For example, other restraining devices could be used provided that they inhibit the gas cylinder 110 from rolling and are capable of gripping about the gas cylinder 110. Also, the handle could be secured to the restraining devices 102 in other ways in the storage mode.

I claim:

1. A lifting device for carrying a cylindrical object, the lifting device comprising:

two restraining devices located about the object and spaced apart along the length of the object, the restraining devices each having a base for inhibiting rolling of the object and the bases each having a locking means for locking the restraining devices together in face to face arrangement;

a handle disposed between the restraining devices; and, an elongate connecting means coupling the handle to the restraining devices;

whereby, in use, a person can carry the object by using the handle, and the restraining devices inhibit rolling of the object when laid on its side.

2. A lifting device according to claim 1, in which each of the restraining devices has an opening capable of expansion and contraction for receiving and clampingly retaining the object;

whereby, in use, raising the handle causes tensioning of the elongate connecting means and clamping of the restraining devices about the object.

3. A lifting device according to claim 2, in which each of the restraining devices has a pair of side portions extending from the base and defining the opening, the side portions being capable of twisting under the action of force of tension in the elongate connecting means, so as to grip the object.

4. A lifting device according to claim 3, in which the side portions each have a support arm having a locking edge for gripping the object;

whereby, in use, twisting of the side portions results in the locking edge gripping into the curved surface of the object.

5. A lifting device according to claim 1, in which the handle is capable of attachment to at least one of the restraining devices in a storage mode.

6. A lifting device according to claim 5, in which the handle is securable within the confines of the restraining devices when in the storage mode.

7. A lifting device according to claim 1, in which the elongate connecting means is chosen from a set including a cord, a cable and a strap.

8. A lifting device for carrying a cylindrical object having two ends and a cylindrical curved surface therebetween, and for supporting the object above a surface when the object is laid on its side, the lifting device comprising:

two restraining devices each having a base, a pair of side portions extending from the base to free ends which are spaced apart and unconnected, and an opening defined between the free ends of the side portions remote from the base, the restraining devices being capable of being deflected for expanding the opening for receiving the object and the opening being capable of contracting so that the restraining devices each clamp about the object, the restraining devices being removably attachable about the curved surface of the object, the restraining devices extending more than half way around the curved surface of the object and being disposable substantially coaxially with the object, the base of each restraining device being disposable substantially parallel to a tangent to the curved surface of the object and the bases of the two restraining devices being alignable substantially in the same plane for spacing the object above the surface and for inhibiting rolling of the object when laid on its side, the restraining devices being devoid of attachment to the ends of the object;

a handle for grasping by a person's hand; and an elongate connecting means for connecting the handle to the two restraining devices for allowing carrying of the object for grasping and raising the handle, the elongate connecting means in combination with each of the restraining devices extending entirely around the curved surface of the object.

9. A lifting device according to claim 8, in which the elongate connecting means cooperates with the restraining devices so that lifting the handle causes tensioning of the elongate connecting means and thus clamping of each of the restraining devices about the curved surface of the object.

10. A lifting device according to claim 9, in which the side portion pairs of one of the restraining means are capable of tilting towards the side portion pairs of the other restraining means under the action of the force of the tension in the elongate connection means so as to grip the curved surface of the object.

11. A lifting device according to claim 10, in which the side portions each have an aperture proximate the free end remote from the base;

the elongate connecting means being routed through the aperture of each of the side portions of one of the restraining means, through the handle and through the aperture of each of the side portions of the other restraining means, whereby, in use, lifting the handle causes tensioning of the elongate connection means which causes the free ends of the side portions to be drawn together for gripping onto the curved surface of the object.

12. A lifting device according to claim 8, in which the side portions each have a support arm having a locking edge for gripping the object;

whereby, in use, lifting of the handle causes twisting of the side portions which results in the locking edges gripping onto the curved surface of the object.

13. A lifting device according to claim 12, in which the locking edge is located along an inner longitudinal edge of each of the restraining devices and the locking edge is disposed substantially parallel to a plane which intersects a longitudinal axis of the object at right angles.

14. A lifting device according to claim 8, in which the base of each of the restraining devices has a locking means for locking the restraining devices together in face to face arrangement for storage purposes in a storage mode.

15. A lifting device according to claim 14, in which the handle is capable of attachment to at least one of the restraining devices in the storage mode.

16. A lifting device according to claim 15, in which the handle is securable within the confines of the restraining devices when in the storage mode.

17. A lifting device according to claim 8, in which the elongate connecting means is chosen from a set including a cord, a cable and a strap.

* * * * *